US007689830B2

(12) United States Patent
Ishii

(10) Patent No.: US 7,689,830 B2
(45) Date of Patent: Mar. 30, 2010

(54) COMMUNICATIONS APPARATUS AND SERVICE PROVIDING TECHNIQUE USING COMMUNICATIONS APPARATUS

(75) Inventor: Yuuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1136 days.

(21) Appl. No.: 11/065,144

(22) Filed: Feb. 24, 2005

(65) Prior Publication Data
US 2005/0246427 A1    Nov. 3, 2005

(30) Foreign Application Priority Data
Feb. 26, 2004  (JP)  ............... 2004-052270
Nov. 30, 2004  (JP)  ............... 2004-347042

(51) Int. Cl.
    H04L 29/06    (2006.01)
    G06F 21/00    (2006.01)
    G06F 7/04     (2006.01)
(52) U.S. Cl. .................. 713/182; 713/155; 713/160; 726/2
(58) Field of Classification Search ................. 709/223; 713/193, 155, 160, 182; 726/2
    See application file for complete search history.

(56) References Cited

U.S. PATENT DOCUMENTS

| 5,655,077 | A  | * | 8/1997  | Jones et al. ............... 726/8 |
| 6,141,758 | A  | * | 10/2000 | Benantar et al. ........... 726/10 |
| 6,957,429 | B1 | * | 10/2005 | Sekijima et al. ........... 718/100 |
| 2003/0135628 | A1 |  | 7/2003 | Fletcher et al. |
| 2003/0237002 | A1 | * | 12/2003 | Oishi et al. ............... 713/201 |
| 2004/0249834 | A1 | * | 12/2004 | Lange et al. .............. 707/100 |
| 2005/0044197 | A1 | * | 2/2005 | Lai ......................... 709/223 |
| 2005/0154914 | A1 | * | 7/2005 | Eguchi et al. ............. 713/201 |

FOREIGN PATENT DOCUMENTS

| EP | 1 330 100 A2 | 7/2003 |
| JP | 2003-91377 | 3/2003 |
| JP | 2003-345713 | 12/2003 |
| WO | WO 02/102016 A2 | 12/2002 |
| WO | WO 2102016 A2 * | 12/2002 |

OTHER PUBLICATIONS

Don Box, et al., "Simple Object Access Protocol (SOAP) 1.1", W3C Recommendation, XP-002163943, May 8, 2000, pp. 1-28.
R. Cunnings, et al., Soap Extensions: Basic and Digest Authentication draft-cunnings-salz-soap-auth-01, IETF Standard-Working-Draft, Internet Engineering Task Force, IETF, No. 1, XP-015000642, Oct. 2001, pp. 1-25.

* cited by examiner

Primary Examiner—Nasser G Moazzami
Assistant Examiner—Mohammad W Reza
(74) Attorney, Agent, or Firm—Oblon, Spivak, McClelland, Maier & Neustadt, L.L.P.

(57) ABSTRACT

A communications apparatus configured to provide a prescribed service via a network based on a standardized interface of a prescribed communications protocol is provided. The communications apparatus includes a proof confirmation unit configured to, upon receiving a request message representing a request for call-up of the standardized interface from a user, extract proof information about the user from a header region of the request message and have validity of the user verified based on the proof information; and a service executing module configured to execute a process in accordance with the standardized interface for which the call-up is requested if the validity of the user is verified.

23 Claims, 14 Drawing Sheets

FIG.7

```
<xml version="1.0" encoding="UTF-8" ?>
<soapenv:Envelope xmlns:soapenv="http://schemas.xmlsoap.org/soap/envelope/"
    xmlns:xsd="http://www.w3.org/2001/XMLSchema"
    xmlns:xsi="http://www.w3.org/2001/XMLSchema-instance">
<soapenv:Header>
    <ns1:authTicket xsi:type="xsd:string"
    xmlns:ns1="http://www.xxxxx">MKDeIIDLSA7KD9</ns1:authTicket>
    <ns1:authURI xsi:type="xsd:string"
    xmlns:ns1="http://www.xxxxx">http://ninshou20/authXXX</ns1:authURI>
</soapenv:Header>
<soapenv:Body>
    <ns2:getKnownTargetDevices soapenv:encodingStyle="http://schemas.xmlsoap.org/soap/encoding/"
    xmlns:ns2="http://www.xxxxx ">
        <targetDeviceIdentifierFilter xsi:type="xsd:anyURI" > pwg-psitd://*/psi/1.0?Location=*B1* </targetDeviceIdentifierFilter>
        < printerFilterElements xsi:type="ns3:Printer" xmlns:ns3="http://www.pwg.org/schema/sm/latest" >
            < printerDescription xsi:type="ns3: printerDescription " xmlns:ns3="http://www.pwg.org/schema/sm/latest" >
                < DeviceId xsi:type="xsd:string ">1252125< /DeviceId>
            < /printerDescription >
        </ printerFilterElements >
    </ns2: getKnownTargetDevices >
</soapenv:Body>
</soapenv:Envelope>
```

FIG.8

```
<?xml version="1.0" encoding="UTF-8" ?>
<soapenv:Envelope xmlns:soapenv="http://schemas.xmlsoap.org/soap/envelope/"
                  xmlns:xsd="http://www.w3.org/2001/XMLSchema"
                  xmlns:xsi="http://www.w3.org/2001/XMLSchema-instance">
 <soapenv:Header>
  <ns1:sessionId  xsi:type="xsd:string"
    xmlns:ns1="http://www........">0123541023658</ns1:sessionId>         311
 </soapenv:Header>
 <soapenv:Body>                                                          312
  <ns1: getKnownTargetDevicesResponse soapenv:encodingStyle="http://schemas.xmlsoap.org/soap/encoding/"
        xmlns:ns2="http://www........">
   <targetDeviceIdentifier xsi:type="soapenc:Array" xsi:type="xsd:anyURI[1]" xmlns:soapenc=
                            "http://schemas.xmlsoap.org/soap/encoding/">
    <item href="#id0"/>
   </ targetDeviceIdentifier >
  </ns1:getKnownTargetDevices >
  <multiRef id="id0" soapenc:root="0" soapenv:encodingStyle="http://schemas.xmlsoap.org/soap/encoding/"
    xsi:type="xsd:anyURI" xmlns:soapenc="http://schemas.xmlsoap.org/soap/encoding/">
    <item> pwg-psltd://*/psi/1.0?Location=*B1*,Name=*Color Printer*</item>   321
  </ multiRef>
 </soapenv:Body>
</soapenv:Envelope>
```

310, 320 (section brackets); 300 (outer frame)

COMMUNICATIONS APPARATUS AND SERVICE PROVIDING TECHNIQUE USING COMMUNICATIONS APPARATUS

BACKGROUND OF THE INVENTION

1. Field of the Invention

The present invention relates to a communications apparatus and a service providing technique using the communications apparatus based on a standardized interface.

2. Description of Related Art

In recent years and continuing, there is a trend toward standardization of interfaces for various services provided as Web services. Standardizing interfaces defined by different venders can reduce inflexibility of relations between a client and a server that provides a service to clients, and allows various services offered by different venders to coexist in a system. Users can have broad options, while the business opportunities expand for the venders of software for realizing services.

JP 2003-091377A discloses a technique for transmitting reference information, instead of the contents to be printed, from a wireless device to cause the print job to be executed for the contents. Another publication, JP 2003-345713A discloses a technique for generating and supplying a proof to an authenticated client and allowing accumulated documents to be output when the verification is presented. The latter technique enables the accumulated documents to be output without wasting the resources, by allowing the authentication function to be shared among multiple processes accessing the accumulated documents.

On the other hand, venders generally want to implement their own functions to distinguish their services from the competitors. However, if the functions of the standardized interface are expanded to deal with independently developed functions, that interface is no longer the standardized one, and the compatibility achieved by the interface standardization will be lost again.

SUMMARY OF THE INVENTION

The present invention is conceived to overcome the above-described problem, and it is an object of the present invention to provide a service providing technique, including a communications apparatus, a service providing program and a recording medium for storing such a program, which allows independently developed functions of services to be implemented in a system without changing the standardized interface.

To achieve the object, in one aspect of the invention, a communications apparatus configured to provide a prescribed service via a network based on a standardized interface of a prescribed communications protocol includes:
(a) a proof confirmation unit configured to, upon receiving a request message representing a request for call-up of the standardized interface from a user, extract proof information about the user from a header region of the request message and have validity of the user verified based on the proof information; and
(b) a service executing module configured to execute a process in accordance with the standardized interface to which the call-up is requested if the validity of the user is verified.

For the verification, the proof confirmation unit may transmit the extracted proof information to an authentication apparatus connected to the communications apparatus via the network, and have the authentication apparatus verify the validity of the user based on the proof information.

In another aspect of the invention, a communications apparatus configured to provide a prescribed service via a network based on a standardized interface of a prescribed communications protocol includes:
(a) a session information confirmation unit configured to, upon receiving a request message representing a request for call-up of the standardized interface, extract a session ID for identifying a session to be held with a source apparatus of the request message from a header region of the request message and verify the validity of the session based on the session identification information; and
(b) a service executing module configured to execute a process in accordance with the standardized interface for which the call-up is made by the request message, if the validity of the session is verified.

In a preferred example, this communication apparatus may further includes a session management module configured to accept a session closing request based on a non-standardized interface.

With either type of communications apparatus, proof information or session identification information can be extracted from the header region of the request message generated for call-up of the standardized interface. Consequently, independently developed functions, including an authentication function or a session management function, can be realized without changing the standardized interface even if the user proof information or the session management information cannot be assigned to the standardized interface itself.

BRIEF DESCRIPTION OF THE DRAWINGS

Other objects, features, and advantages of the present invention will become more apparent from the following detailed description when read in conjunction with the accompanying drawings, in which:

FIG. 7 is an example of a SOAP message for requesting a call for a printer list acquiring method;

FIG. 8 is an example of a SOAP message containing return information of the printer list acquiring method;

DETAILED DESCRIPTION OF THE PREFERRED EMBODIMENT

Figure 1:
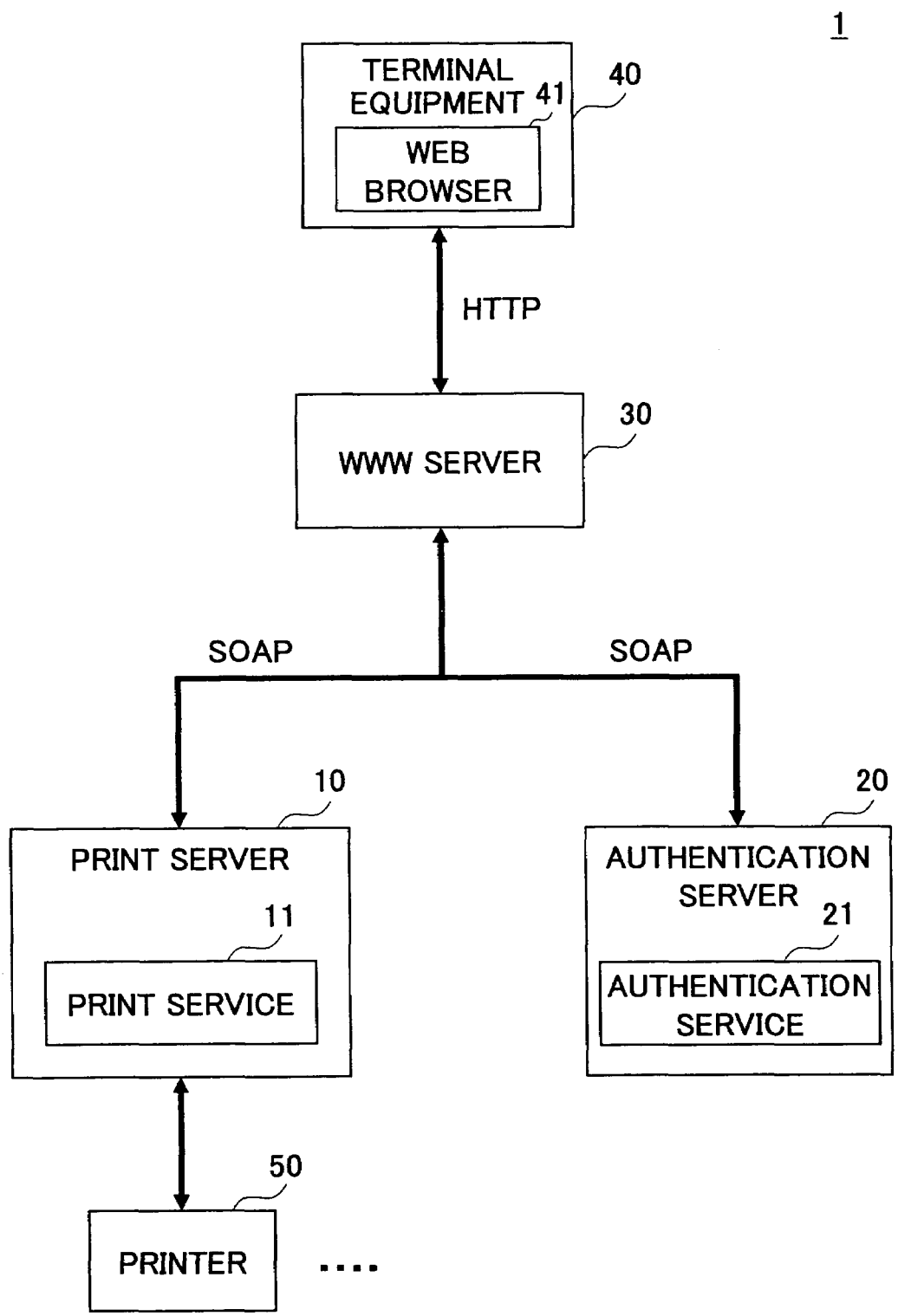
FIG. 1 is a schematic diagram illustrating a printing system according to the first embodiment of the invention.

The preferred embodiment of the present invention is now explained below in conjunction with attached drawings. FIG. 1 is a schematic diagram illustrating a printing system 1 according to the first embodiment of the invention. The printing system 1 includes a print server 10, an authentication server 20, a World-Wide-Web (WWW) server 30, and terminal equipment 40, which are mutually connected via a local area network (LAN) or a network (regardless whether wired or wireless) such as the Internet.

The authentication server 20 is a computer in which an authentication service 21 is implemented. The authentication service 21 is software for providing an authentication function, as a Web service, to perform user authentication based on a user name and a password on the network. If the user authentication is successfully made, the authentication server 21 generates electronic proof (hereinafter, referred to as a "ticket") for certifying the user authentication. A client can make use of the authentication service 21 by calling up the function interface of the authentication service 21 by means of a remote procedure call (RPC) of the Simple Object Access Protocol (SOAP). In this embodiment, the function interface of the authentication service 21 is a non-standardized interface independently developed by a vender.

The print server 10 is a computer to which one or more printers 50 are connected, and is installed with a print service 11. The print service 11 is software for providing a print-job processing function, as a Web service, through a standardized interface to printers 50 connected to the print server 10 on the network. Accordingly, the client (i.e., the WWW server 30) can make use of the function of the print service 11 by calling for a standardized interface of the print service 11 by means of an RPC of the SOAP protocol.

A standardized interface is an interface commonly provided by multiple venders, such as an interface established by a working group for standardization or an interface recognized as de facto standard.

It should be noted that in this embodiment the print service 11 is implemented with a security function for allowing the service to be provided only to a request with a valid ticket generated by the authentication service 21, as well as a managing function for managing a session with the WWW server 30. In other words, the print service 11 implements these functions within the scope of the standardized interface, although the interfaces (such as arguments and/or return values) corresponding to these functions are not defined in the standardized interfaces.

Examples of the standardized interface used in the embodiment include a print service interface (PSI), which is a proposed as a print service standardized interface by the PWG (Printer Working Group).

The WWW server 30 is a computer that provides a Web page to terminal equipment 40, through which page the user can make use of the services offered by the print service 11 and the authentication service 21. In response to an HTTP request made through the browser 41 of the terminal equipment 40, the WWW server 30 calls the function of the print service 11 or the authentication service 21 by means of an RPC based on the SOAP protocol.

The terminal equipment 40 is a communications apparatus with a browser 41 used by the user. Examples of the terminal equipment 40 include a personal computer (PC), a personal digital assistant/personal data assistant (PDA), and a cellular phone.

Figure 2:
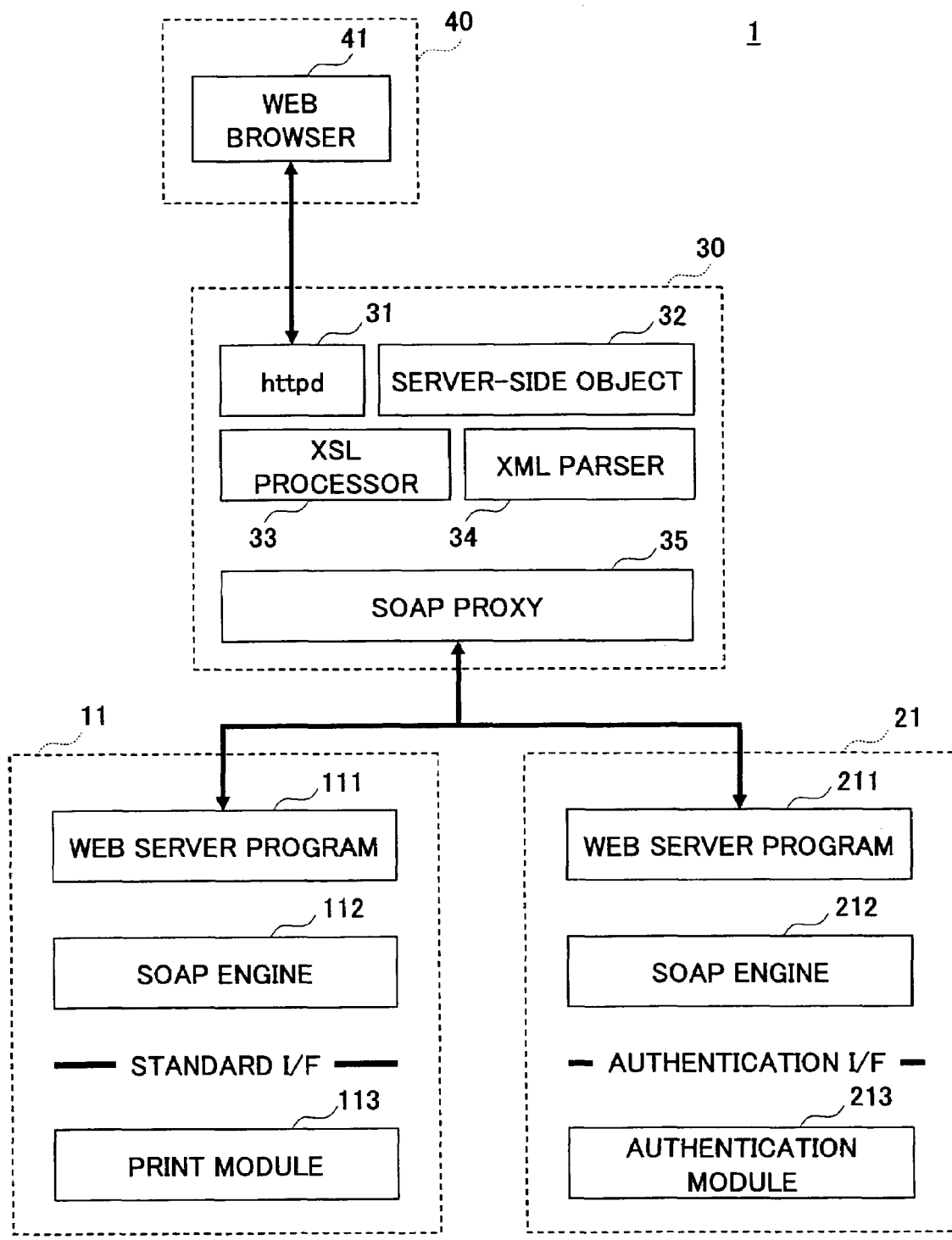
FIG. 2 is a block diagram illustrating the functional structure of the printing system according to the first embodiment of the invention.

FIG. 2 is a block diagram illustrating the functional structure of the printing system according to the first embodiment of the invention. The print service 11 of the print server 10 includes a Web server program 111, a SOAP engine 112, and a print module 113. The Web server program 111 is a program for allowing the print server 10 to communicate with the WWW server 30 by HTTP protocol. That is, in this embodiment, the HTTP is applied to the transport layer of the SOAP communication. Accordingly, SOAP messages are transmitted between print server 10 and the WWW server 30 based on the HTTP protocol.

The SOAP engine 112 is a module whose major function is deserializing the SOAP message contained in the HTTP message and calling a function of the print module 113 requested by the SOAP message. The SOAP engine 112 also serializes the return information returned from the called function into a SOAP message, which message is then transmitted to the WWW server 40 via the Web server program 111. In this manner, remote procedure call (RPC) of the SOAP with respect to the function of the print module 113 is realized by the SOAP engine 112.

Print module 113 is a module providing a print-job processing function to the printer 50 via a standard interface. The standard interface of the print module 113 is provided transparently on the network by means of the SOAP engine 112 and the Web server program 111. Consequently, the WWW server 30 can call up the functions of the print module 113 based on the standard interface. The authentication service 21 of the authentication server 20 includes a Web server program 211, a SOAP engine 212, and an authentication module 213. The Web server program 211 and the SOAP engine 212 take the same roles as the Web server program 111 and the SOAP engine 112 of the print service 11, and allow remote procedure call (RPC) of the SOAP protocol with respect to the functions of the authentication module 213.

The WWW server 30 includes an httpd 31, a server-side object 32, an XSL processor 33, an XML parser 34, and a SOAP proxy 35. The httpd 31 is a program for causing the server-side object 32 to carry out a process corresponding to a HTTP request from the Web browser 41 and to return the processing result as a an HTML Web page to the Web browser 41. The server-side object 32 is a so-called Web application designed so as to execute the process corresponding to the HTTP request from Web browser 41. The XSL processor 33 is a module configured to convert XML data according to XSL data. The XML parser 34 is a module configured to spread out the XML data described in the text format into the tree structure of the memory so as to allow the XML data to be used by other applications.

The SOAP proxy 35 is a module configured to provide the standardized interface of the print service 11 or the authentication interface of the authentication service 21 transparently, with respect to the server-side object 32. In other words, the SOAP proxy 35 provides a function interface in conformity with the same specification as that of the standardized interface and authentication interface to the server-side object 32. In response to a call request for the function, the SOAP proxy 35 transmits an HTTP request, which contains a SOAP message requesting a call for the standardized interface or the authentication interface, to the print service 11 or the authentication service 21. When receiving an HTTP response, the SOAP proxy 35 outputs the return information contained in the HTTP response, to the server-side object 35.

Figure 3:
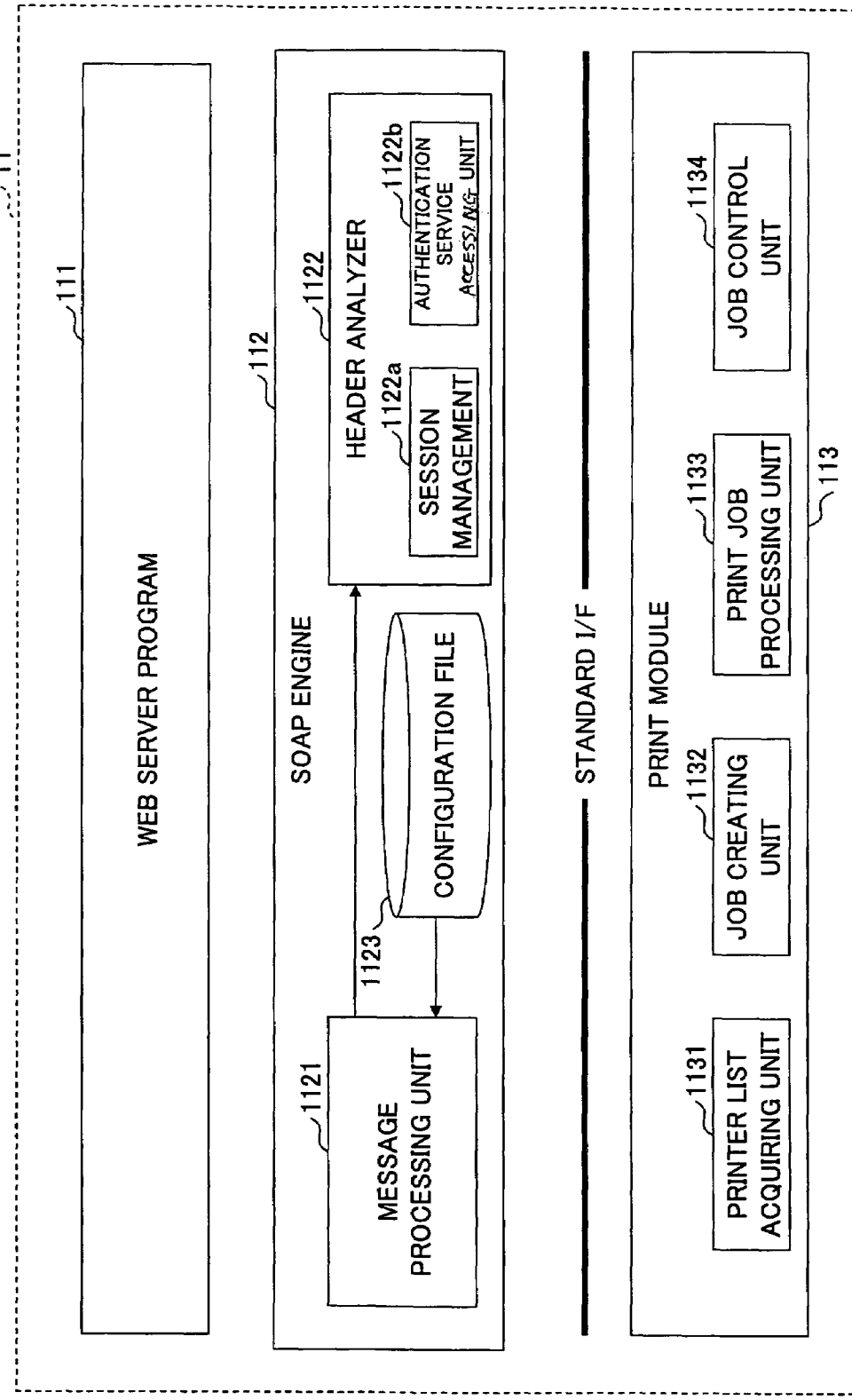
FIG. 3 is a block diagram illustrating the functional structures of the SOAP engine and the print module in the print service shown in FIG. 1.

The SOAP engine 112 and the print module 113 of the print service 11 are explained in more detail below. FIG. 3 is a block diagram illustrating the functional structures of the SOAP engine 112 and the print module 113 of the print service 11. The SOAP engine 112 includes a message processing unit 1121, a header analyzer 1122, and a configuration file 1123. The message processing unit 1121 serializes and deserializes the SOAP messages, and calls up the functions of the print module 113 requested by the SOAP messages, thereby enabling remote procedure call (RPC).

The header analyzer 1122 analyzes the SOAP header of the SOAP message to carry out a process for implementing the independently developed function contained in the SOAP header, which is described in more detail below. The header analyzer 1122 includes a session management unit 1122a and an authentication service accessing unit 1122b. The session management department unit 1122a manages sessions between the WWW server 30 and the print server 10. The authentication service accessing unit 1122b implements a security process based on a ticket. Information about how to call the header analyzer 1122 (call-out information) is stored in the configuration file. When the SOAP message is processed by the message processing unit 1121, the header analyzer 1122 is called using the call-out information. The message processing unit 1121 determines whether to call up the header analyzer 1122 or which call-out method is to be used.

In the first embodiment, the head analyzer 1122 is implemented as expanded functions of the SOAP engine 112. Some commercially available SOAP engines have functions (such as handler function) for calling up necessary functions to process the SOAP message using a prescribed interface. The header analyzer 1122 may be implemented as the handler function. It is possible to access the SOAP message within the handler function, to see the information added to the SOAP header to realize the independently developed functions. If the header analyzer 1122 is implemented as the handler function, the configuration file 1123 stores as the called-out information the file names of the dynamic link library (DLL) in which the handler function is installed.

The print module 113 of the print service 11 includes a printer list acquiring unit 1131, a job creating unit 1132, a print-job processing unit 1133, and a job control unit 1134. The printer list acquiring unit 1131 acquires information listing currently available printers. The job creating unit 1132 generates a print job when a print request is made. The print-job processing unit 1133 causes the printers 50 to execute the requested print job. The job control unit 1134 controls print jobs, dealing with cancellation or interruption of a print job. The functions performed by these units can be called up via the standardized interface.

Figure 4:
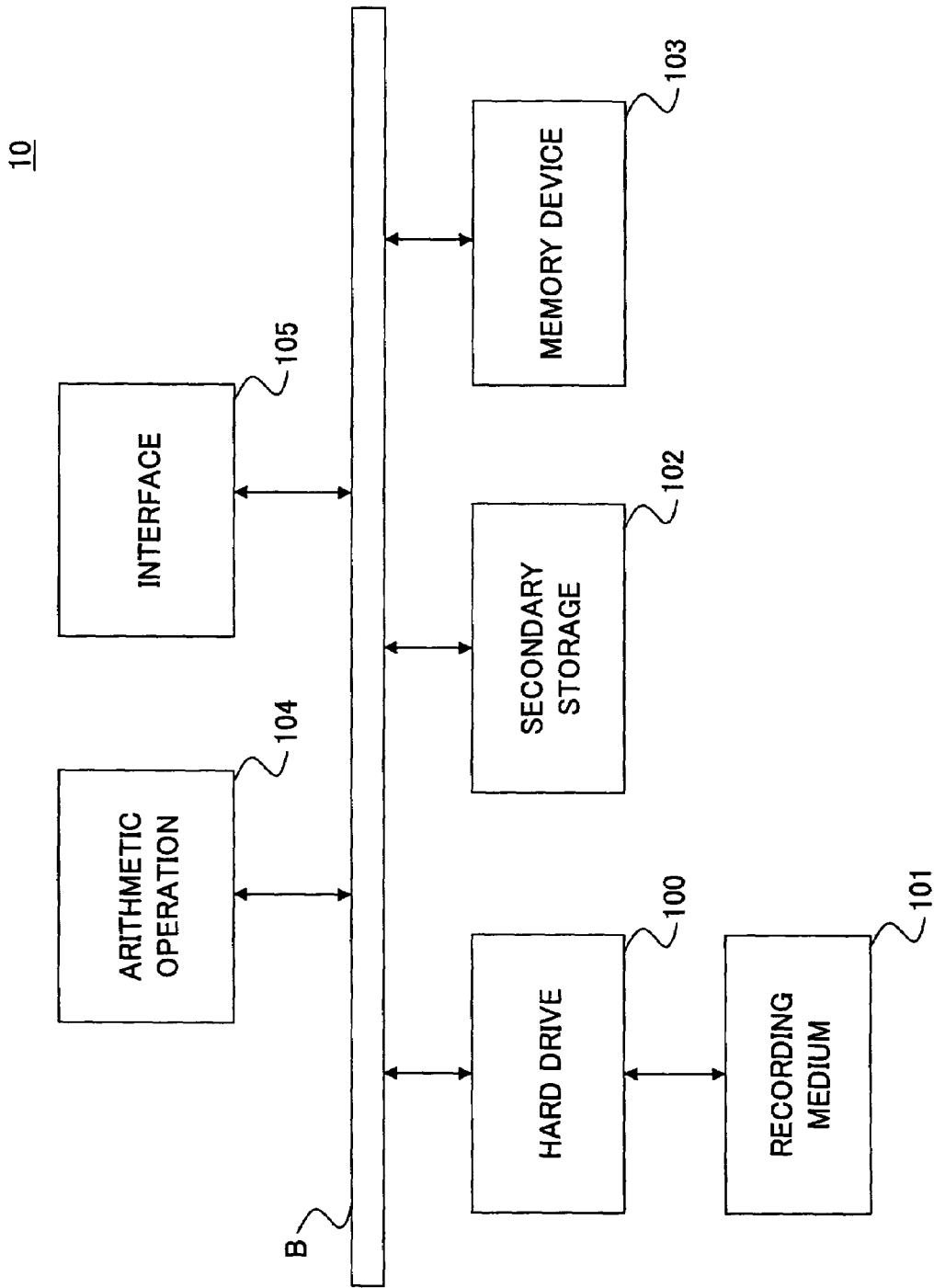
FIG. 4 is a block diagram illustrating the hardware structure of the print server according to the first embodiment of the invention.

Next, explanation is made of the hardware structure of the print server 10. FIG. 4 is a schematic diagram illustrating the hardware structure of the printer server 10. The print server 10 includes a disk drive 100, a secondary storage 102, a memory device 103, an arithmetic operation unit 104, and an interface 105, which are mutually connected via the bus B.

The program defining the process to be executed in the print server 10 is stored in, for example, a recording medium 101, such as a CD-ROM. When the recording medium 101 is set in the disk drive 100, the program is installed by the disk drive 100 from the recording medium 101 into the secondary storage 102. The secondary storage 102 stores the installed program, together with necessary files and data items. Upon a program starting instruction, the memory device 103 reads the program from the secondary storage 102 to hold the program. The arithmetic operation unit 104 executes the processes defining the functions of the print server 10, in accordance with the program held in the memory device 103. The interface 105 is, for example, a modem or a router, and is used to connect the print server 10 to the network.

The authentication server 20 and the WWW server 30 may employ the same structure as the print server 10 illustrated in FIG. 4.

Figure 5:
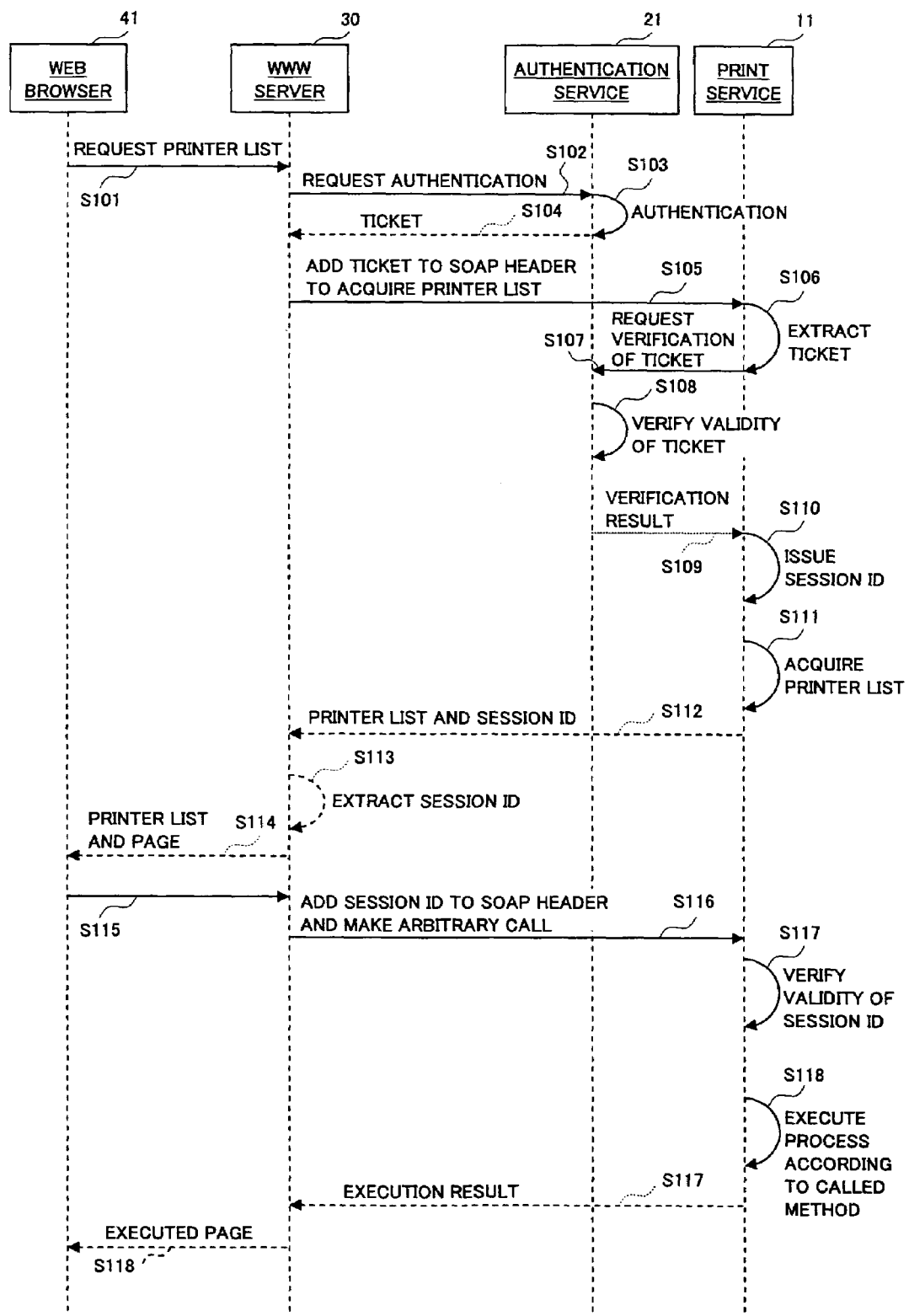
FIG. 5 is a sequence diagram illustrating the process carried out in the printing system according to the first embodiment of the invention.

The process carried out in the printing system 1 shown in FIG. 2 is explained in conjunction with FIG. 5. FIG. 5 is a sequence diagram illustrating the process of the printing system 1 according to the first embodiment of the invention. When the user of terminal equipment 40 wishes to browse the printer list listing the currently available printers in the system, the print service 11 implements the security function using a ticket and the session management function for managing the session with the WWW server 30, while maintaining the standardized interface.

In step S101, the Web browser 41 transmits an HTTP request for the Web page viewing the currently available printer list (which page is referred to as the "printer list page") to the WWW server 30, based on the user input. The user input is, for example, inputting the URL of the printer list page. Although not shown in the figure for convenience sake, the httpd 31 of the WWW server 30 first transmits a Web page requesting the password (which page is referred to as the "login page") to the Web browser 41, in response to the HTTP request for the printer list page, because the password is set for the printer list page. The user name and the password input in the login page through the Web browser 41 are returned to the WWW server 30.

In step S102, the httpd 31 calls for the server-side object 32 in response to the HTTP request from the Web browser 41. The server-side object 32 then transmits a SOAP message (SOAP request) requesting a call for an authentication method of the authentication module 213 of the authentication service 21, via the SOAP proxy to the authentication service 21, using the user name and the password as the arguments. Thus, user authentication is requested from the WWW server 30 to the authentication server 20.

In step S103, the SOAP engine 212 of the authentication service 21 analyzes the SOAP message, and calls for the authentication method of the authentication module 213. The authentication module 213 performs user authentication based on the user name and the password. When the user authentication is successfully done, the process proceeds to step S104, in which the authentication module 213 generates a ticket for demonstrating the success of user authentication, and transmits a SOAP message (SOAP response) containing the ticket to the WWW server 30. The ticket contains information such as the ticket ID identifying this ticket, the valid range representing the valid services admitted with this ticket, the expiration date of the ticket, the user ID, and the anti-tamper check codes. The ticket itself is encoded such that only the authentication module 213 can reference the ticket.

In step S105, the server-side object 32 acquires the ticket contained in the SOAP response from the authentication module 213, and transmits a SOAP message (SOAP request) requesting a call for the printer list acquiring method of the print module 113 to the print service 11 via the SOAP proxy 35. In this manner, the WWW server 30 requests the print service 1 to provide the printer list.

Since the print module 113 is configured to provide services only to requests with valid tickets, the server-side object 32 or the SOAP proxy 35 has to include the ticket in the SOAP request. However, the ticket is information unique to a vender, while the printer list acquiring method of the print module 113 is one of the standardized interfaces without having an interface (argument) for designating the ticket. To overcome this problem, in the first embodiment, the SOAP proxy 35 adds the ticket to the SOAP header in order to add the information required to realize the unique function to the SOAP request, while maintaining the standardized interface. The SOAP proxy 35 also adds the URL of the authentication service 21, as ID information of the authentication service 21 that has generated the ticket, to the SOAP header so as to allow the print service 11 to identify the source of the ticket.

Figure 6:
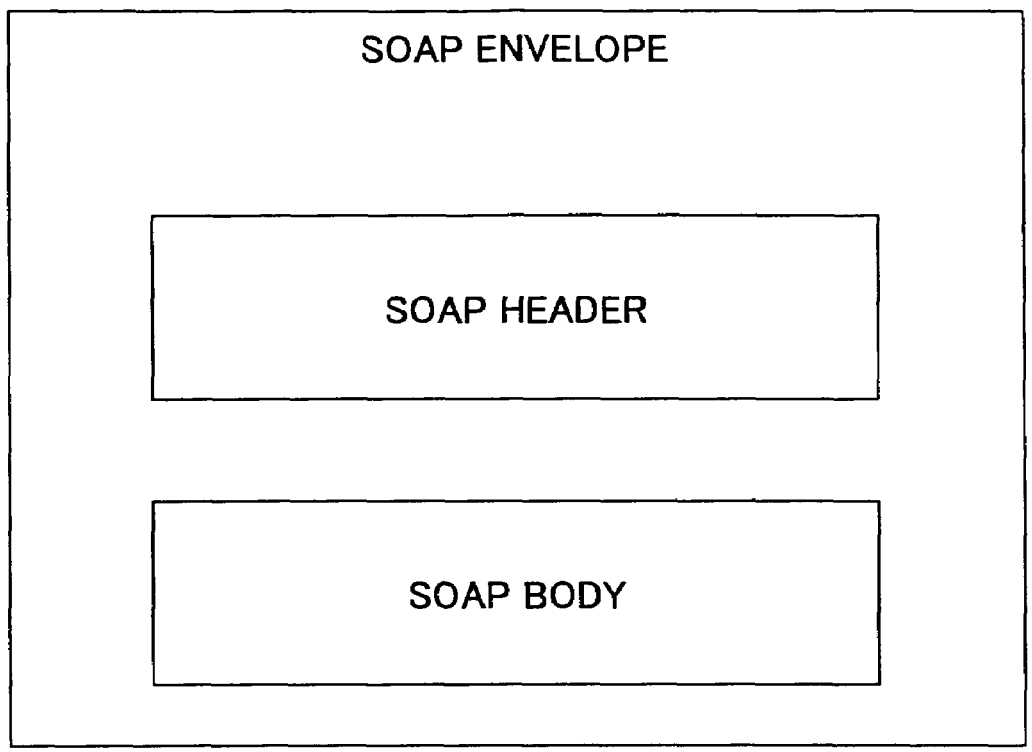
FIG. 6 is a schematic diagram illustrating the structure of a typical SOAP message.

FIG. 6 is a schematic diagram illustrating the structure of a typical SOAP message. A typical SOAP message is contained in a virtual envelope called a SOAP envelope. The SOAP massage consists of a SOAP header and a SOAP body. In the SOAP header is described additional information. The SOAP body describes call-up information for a method if the SOAP message is a request, and it describes a processing result (including return values) if the SOAP message is a response. In the first embodiment, the SOAP header is utilized to add information for realizing the unique function to the SOAP message, FIG. 7 illustrates an example of SOAP message 200 requesting a call for the printer list acquiring method. In the SOAP message 200, Header element 210 defined by the <Header> tag represents the SOAP header. The Header element 210 includes an "authTichet" element 211 and an "authURI" element 213, as sub-elements. The "authTichet" element 211 contains a value 212 representing a ticket serialized by codes 212. The "authURI" element 213 contains a coded value 214 representing the URI for the authentication service 21.

On the other hand, the Body element 220 defined by the <Body> tag represents the SOAP body, which is the body of the call-up information for the printer list acquiring method provided as the standardized interface. The tag name "getKownTargetDevices" 211 indicates the name of the printer list acquiring method. The SOAP body also includes a sub-element 222 that includes the argument for the printer list acquiring method.

Returning now to FIG. 5, in step S106 following step S105, the message processing unit 1121 of the SOAP engine 112 in the print service 11 references the configuration file 1123 to call for the head analyzer 1122. The authentication service accessing unit 1122b of the header analyzer 1122 extracts the ticket and the URI with respect to the authentication service 21 from the SOAP header of the SOAP message 200. Then, in step S107, the authentication service accessing unit 1122b transmits a SOAP message (SOAP request) to the authentication service 21, using the extracted ticket as the argument. This SOAP message is a request for call-up of the ticket verification method of the authentication module 213 in authentication service 21 to verify the validity of the ticket. The authentication service accessing unit 1122b specifies the authentication service 21 based on the URI extracted from the SOAP header.

In step S108, the authentication module 213 verifies the validity of the ticket, including inspection of whether the ticket is expired and/or the ticket is tampered with. Then, in step S109, the authentication module 13 transmits a SOAP message (SOAP response) containing the ticket verification result to the printer service 11, via the SOAP engine 212 and the Web server program 211.

If the ticket verification result supplied from the authentication service 21 indicates the invalidity of the ticket, the authentication service accessing unit 1122b transmits a SOAP message (SOAP Fault) indicating an error, as return information as for the printer list acquiring method, to the WWW server 30, whereby the authentication service is rejected. On the other hand, if the ticket verification result indicates the validity of the ticket, the process proceeds from step S109 to S110. In step S110, the session management unit 1122a of the head analyzer 1122 opens a session with the server-side object 32 of the WWW server 30, and assigns a session ID to the session. The assigned session ID is managed as a data item in a prescribed database or file.

In step S111, when the printer list acquiring method of the print module 113 is called by the message processing unit 1121, the printer list acquiring unit 1131 of the print module 113 acquires the printer list information listing the printers currently connected to the print server 10, and outputs the printer list to the message processing unit 1121. In step S112, the message processing unit 1121 serializes the printer list, and transmits a SOAP message (SOAP response) containing the serialized printer list to the WWW server 30.

In order to maintain the session opened in step S110, it is necessary to report the session ID to the WWW server 30. However, the session managing function is a unique function to the vender, while the printer list acquiring method is one of the standardized interfaces and does not have an interface (return value) for returning the session ID. To overcome this problem, the message processing unit 1121 of the first embodiment calls for the header analyzer 1122 to cause the session management unit 1122a of the header analyzer 1122 to add the session ID to the SOAP header. In this manner, the information for realizing the session managing function is contained in the SOAP response, while maintaining the standardized interface.

FIG. 8 illustrates an example of the SOAP message 300 containing the return information of the printer list acquiring method. The Header element 310 of the SOAP message 300 includes a "sessionID" element 311 as the sub-element. The "sessionID" element 311 contains a value 312 representing the session ID.

On the other hand, the Body element 320 includes return information of the printer list acquiring method in accordance with the standardized interface. The "item" element 321 represents information about a printer. When information items of multiple printers 50 are acquired, multiple "item" elements are to be contained in the Body element 320.

Returning to FIG. 5, the process proceeds to step S113 following step S112. The SOAP proxy 35 of the WWW server 30 extracts the session ID from the SOAP header of the received SOAP response, which session ID is managed in the WWW server 30. The SOAP proxy 35 also deserializes the printer list contained in the SOAP response, and outputs the deserialized printer list to the server-side object 32. Then, in step S114, the server-side object 32 generates a printer list page based on the printer list output from the SOAP proxy 35. The generated printer list page is transmitted to the Web browser 41 by means of httpd 31, and displayed in the Web browser 41

It is assumed that the user makes a manipulation in the displayed printer list page. Then, in step S115, the WWW browser 41 transmits an HTTP request corresponding to the user manipulation to the WWW server 30. In step S116, the server-side object 32 is called by the httpd 31 based on the HTTP request, and the server-side object 32 calls for the standardized interface to execute the requested process. In other words, the SOAP proxy 35 transmits a SOAP request for call-up of the standardized interface to the print service 11.

In order to maintain the session with the print service 111, it is necessary to report the session ID managed at the WWW server 30 to the print service 11. However, the standardized interface does not have an interface for reporting the session ID. To overcome this problem, the SOAP proxy 35 of the first embodiment adds the session ID to the SOAP header. In this manner, the session ID is reported to the print service 11, while maintaining the standardized interface.

Then, in step S117, the message processing unit 1121 of the SOAP engine 112 of the print service 11 references the configuration file 123 to call for the header analyzer 1122. The session management unit 1122a of the header analyzer 1122 extracts the session ID from the SOAP header of the SOAP request, and verifies the validity of the session ID. If the validity of the session ID is verified, the process proceeds to step S118. In step S118, the standardized interface requested by the message processing unit 1121 is called for, and the print module 113 executes the process in accordance with the standardized interface. In addition, the processing result is transmitted to the WWW server 30 (S117), and the Web page displaying the processing result is transmitted to the Web browser 41 (S118).

In the subsequent process, in response to another user manipulation, steps S115 through S118 are repeated to maintain the session between the WWW server 30 and the print service 11. Accordingly, single sign-on and other procedures may be realized.

Figure 9:
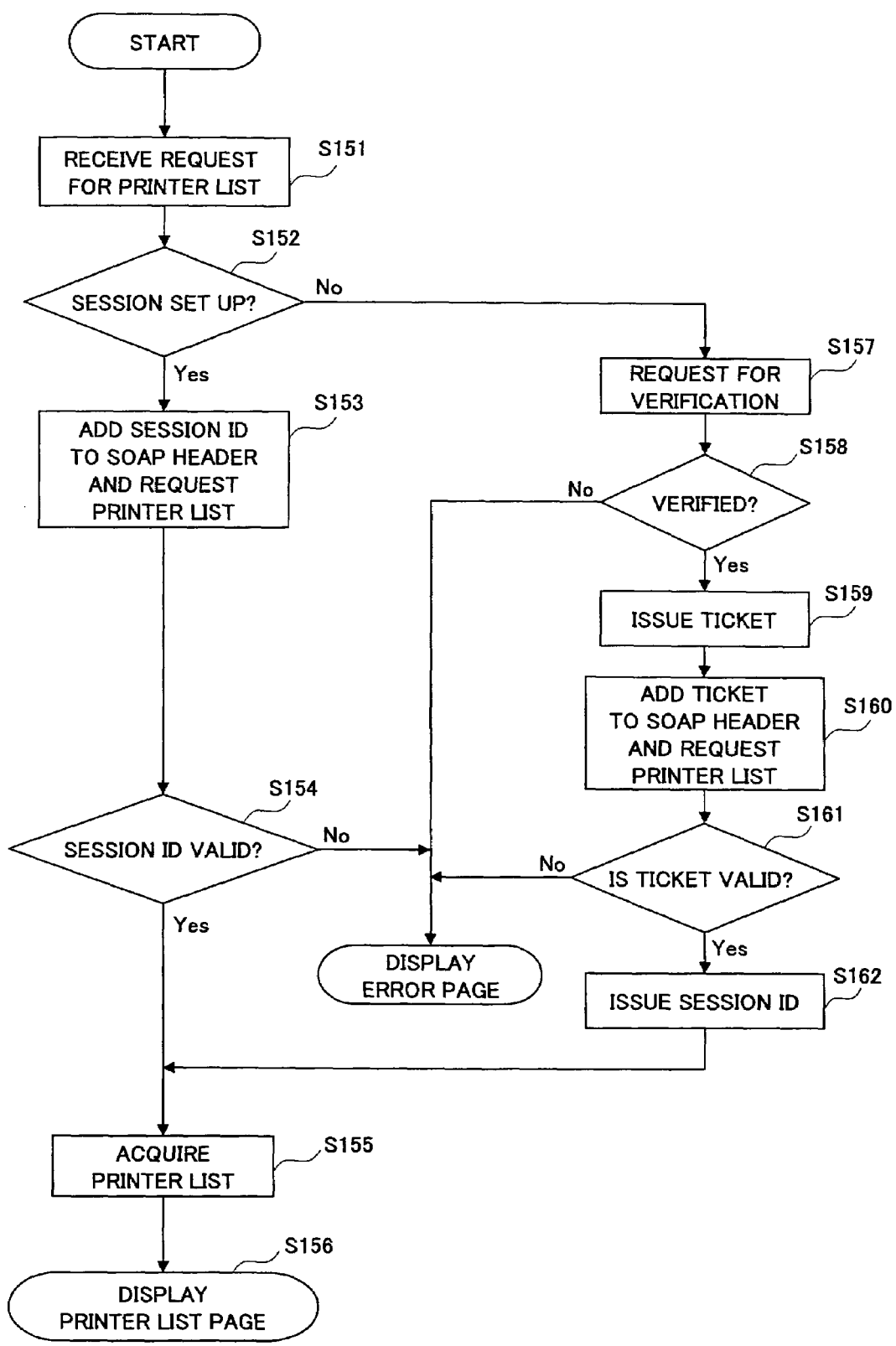
FIG. 9 is a flowchart showing the operations of the printing system according to the first embodiment of the invention.

FIG. 9 is a flowchart showing the operations of the printing system, which are described above in conjunction with the sequences of FIG. 5.

Upon receiving an HTTP request demanding a printer list page (S151), the WWW server 30 determines whether the session with the print service 11 is already opened (S152). If the session has not been opened, the WWW server 30 requests the authentication service 21 to conduct user authentication (S153). The authentication service 21 authenticates the user. If the authentication is successful, a ticket is issued to the WWW server 30 (S159). If the authentication fails, a Web page reporting the error is displayed on the Web browser 41.

When acquiring the ticket, the WWW server 30 adds the ticket to the SOAP header, and transmits the SOAP request to the print service 11, requesting call-up of the printer list acquiring method (S160). Upon receiving the SOAP request, the print service 11 causes the authentication service 21 to verify the validity of the ticket extracted from the SOAP header (S161). If the validity of the ticket is verified, the session ID is issued (S162). If the ticket is invalid, an error page is displayed in the Web browser 41 (S156).

If it is determined in step S152 that the session is already opened, the WWW server 30 adds the session ID already generated and stored to the SOAP header, and transmits the SOAP request to the print service 11, requesting call-up of the printer list acquiring method (S153). Upon receiving the SOAP request, the print service 11 verifies the validity of the session ID extracted from the SOAP header (S154). If the session ID is valid, the print service 11 acquires a printer list (S155). Then, the printer list page is displayed on the Web browser 41 (S156). If the session ID is invalid, an error page is displayed on the Web browser.

As has been described above, with the printing system 1 according to the first embodiment, tickets and/or session IDs can be transmitted between the WWW server 30 and the print service 11 by attaching the ticket or session ID to the SOAP header. Consequently, the authenticating function and the session managing function using a ticket can be realized, without expanding the body part defined as the standardized interface in the SOAP message. Although, in the first embodiment, the authenticating function is realized using a ticket, other information, such as typically used user names and passwords, or fingerprint data may be presented as proof information. In this case, the username and/or password, or the fingerprint data are added to the SOAP header.

With the printing system 1 of the first embodiment, the session between the WWW server 30 and the print service 11 can be opened and maintained; however, the closing of the session cannot be clearly recognized by the print service 11. This is because the standardized interface does not define an interface aware of the session managing function, or interface (function) to receive termination of a session. Therefore, even if the Web browser 41 transmits a logout-requesting HTTP request to the WWW server 30 based on the instruction from the user, it is only the WWW server 30 that can recognize the closing of the session because there are no means for reporting the termination of the session from the WWW server 30 to the print service 11. As a result, the session is treated as a valid one until timeout occurs in the print service 11 that is managing the session.

In view of this inconvenience, in the second embodiment, the printing system is configured such that the print service 11 can clearly recognize the closing of a session.

Figure 10:
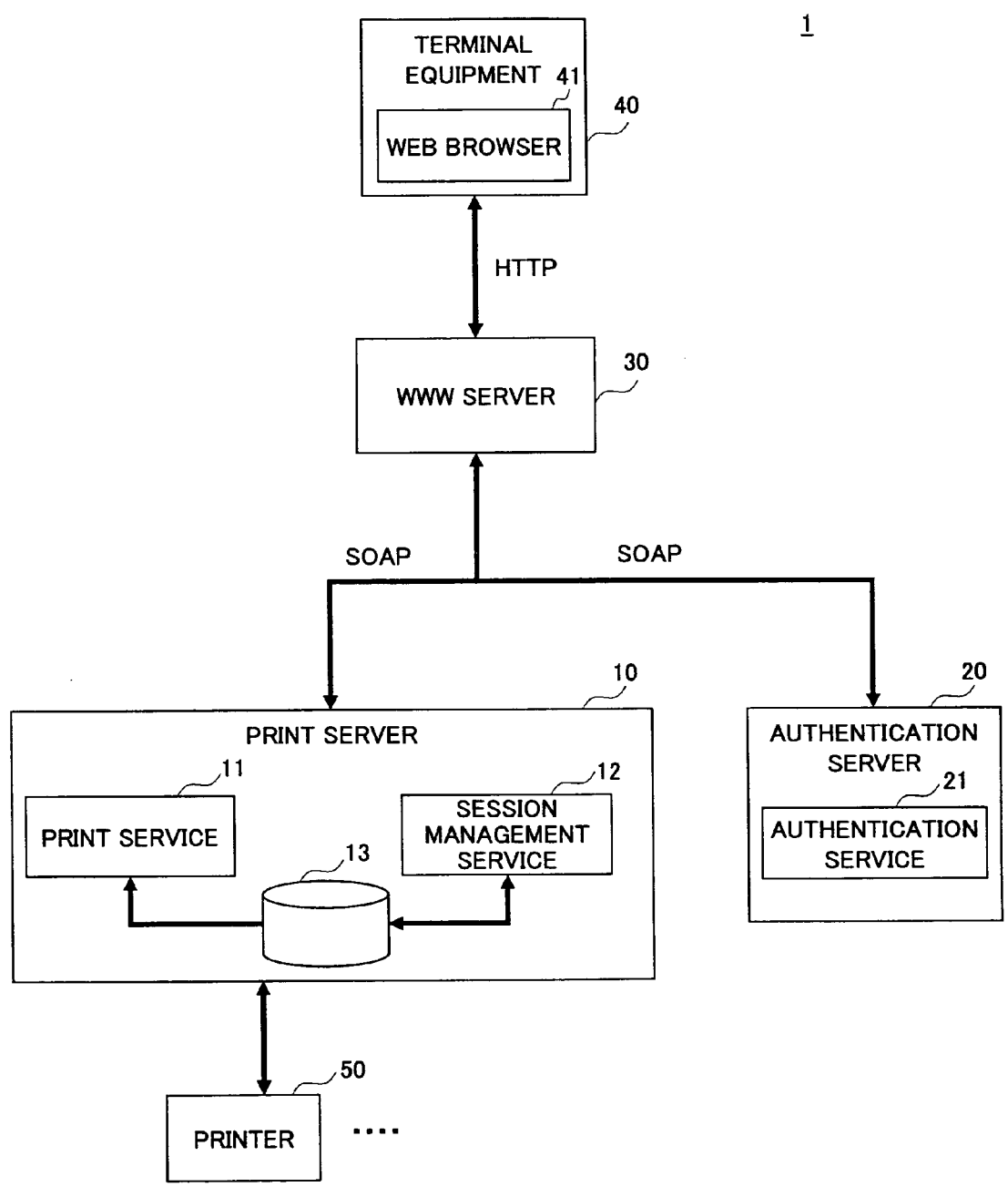
FIG. 10 is a schematic diagram illustrating a printing system according to the second embodiment of the invention.

FIG. 10 is a schematic diagram illustrating a printing system according to the second embodiment of the invention. The same elements as those shown in FIG. 1 are denoted by the same numerical symbols, and explanation for them is omitted. The print server 10 of the second embodiment has a session management service 12 and a session management area 13, in addition to the print service 11. The session management service 12 is software offering a function of managing a session between the WWW server 30 and the print service 11 as a Web service on the network. Accordingly, a client can make use of the function of the session management service 12 by calling the function interface of the session management service 12 by means of remote procedure call (RPC) of the SOAP. Since the session management service 12 is independently developed, the function interface is unique to the vender.

The session management area 13 is an area for saving databases or files for managing the session IDs generated by the session management service 12. It is necessary for the session management area 13 to be accessible from both the print service 11 and the session management service 12. Although the print service 11 and the session management service 12 are implemented in the same hardware (print server 10) in the example shown in FIG. 10, the session management service 12 may be installed in another computer.

Figure 11:
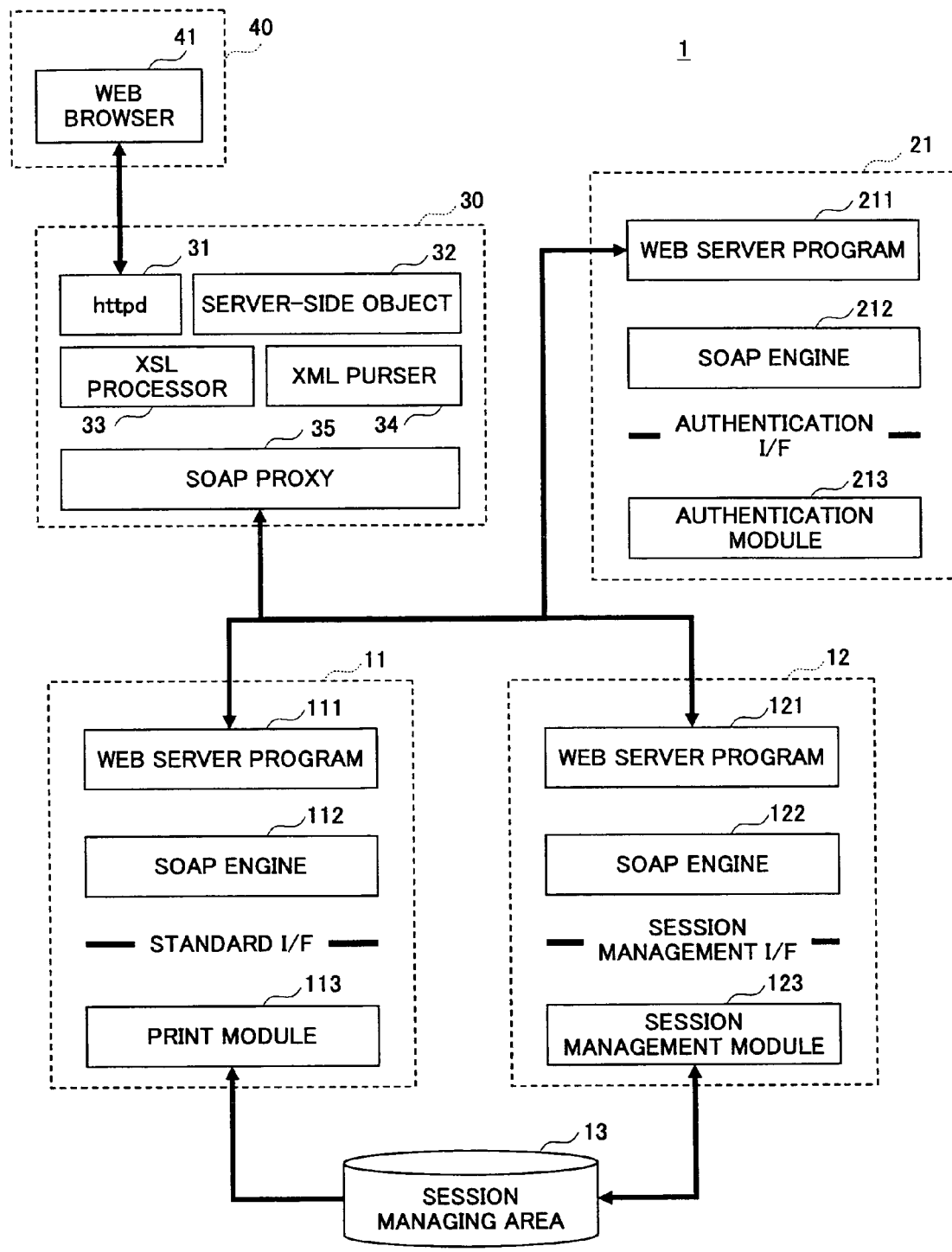
FIG. 11 is a block diagram illustrating the functional structure of the printing system according to the second embodiment of the invention.

FIG. 11 is a block diagram illustrating the functional structure of the printing system according to the second embodiment of the invention. The same elements as those shown in FIG. 2 are denoted by the same numerical symbols and explanation for them is omitted. The session management service 12 includes a Web server program 121, a SOAP engine 122, and a session management module 123. The Web server program 121 and the SOAP engine 122 take the same roles as the Web server program 111 and the SOAP engine 112, respectively, of the print service 11, and enable remote procedure call (RPC) by the SOAP to the session management module 123. The session management module 123 is a module providing a function of managing a session using an independently developed function interface (session management interface) unique to the vender. For example, the session management module 123 has a session opening method for accepting a session opening request and a session closing method for accepting a session closing request.

Figure 12:
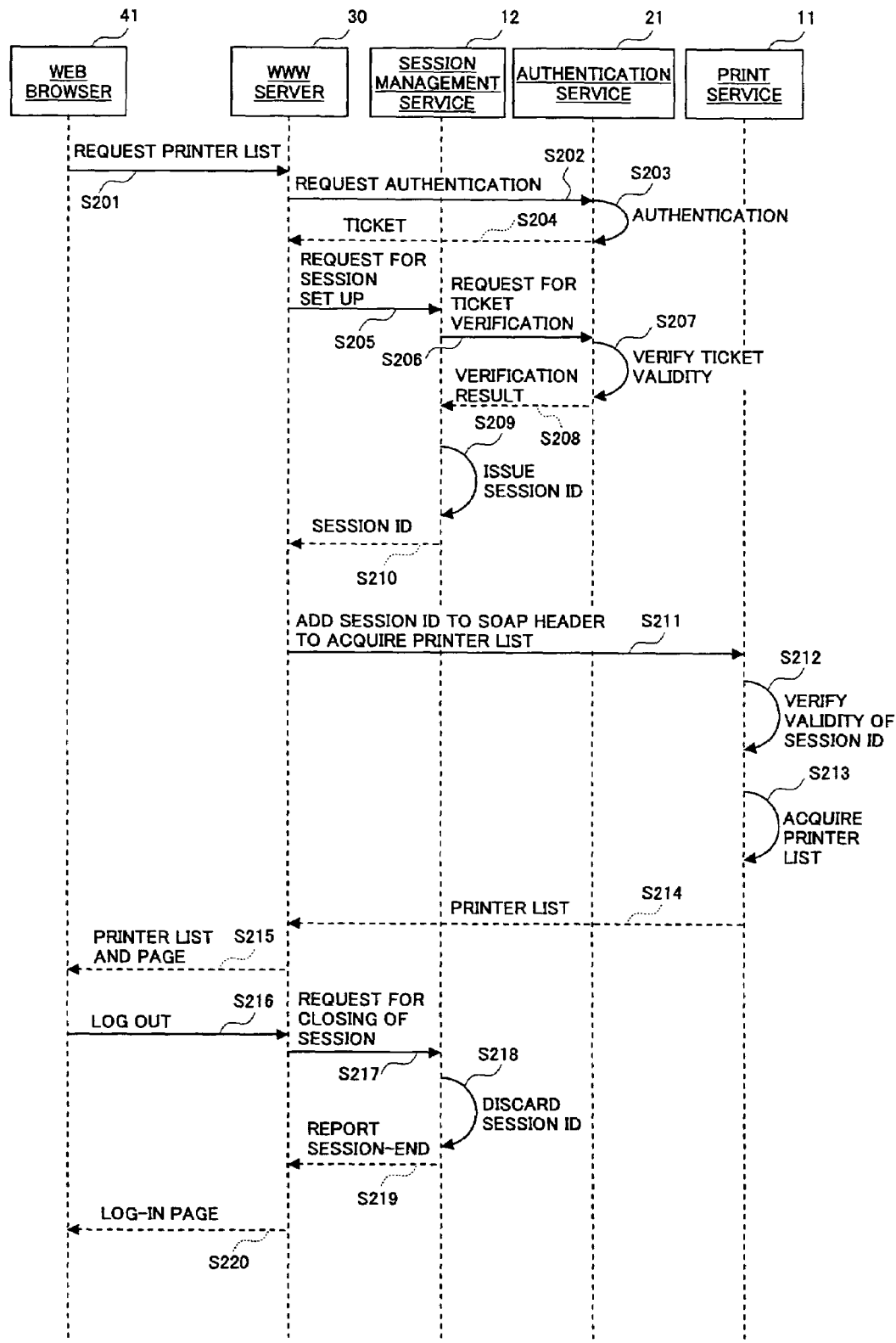
FIG. 12 is a sequence diagram of a process carried out in the printing system according to the second embodiment of the invention.

FIG. 12 is a sequence diagram illustrating the process carried out in the printing system 1. It is assumed that the user of the terminal equipment 40 is trying to browse the currently available printer list. In the initial state shown in FIG. 12, a session has not been opened between the WWW server 30 and the print service 11.

Steps S201 through S204 are the same as steps S101 through S104 shown in FIG. 5. In response to an HTTP request demanding for a printer list page transmitted from the Web browser 41 (S201), the WWW server 30 requests the authentication service 21 to conduct user authentication (S202) to acquire a ticket from the authentication service 21 (S203 and S204).

In step S205 following step S204, the server-side object 132 of the WWW server 30 transmits a SOAP message (SOAP request) to the session management service 12 via the SOAP proxy 35, demanding for call-up of the session opening method of the session management module 123 in the session management service 12. Since the session opening method is an independently developed interface awared of the ticket, the ticket is designated as the argument.

Following step S205, steps S206 through S209 are the same as steps S107 through S110 shown in FIG. 5, except that the session management service 12 carries out the operations in place of the print service 11 and the ticket is assigned to the argument of the session opening method, not to the SOAP header. Accordingly, in response to the call-up of the session opening method, the session management module 123 requests the authentication service 21 to verify the validity of the ticket assigned to the argument (S206). Upon receiving the verification of the validity of the ticket from the authentication service 21 (S207 and S208), the session management module 123 opens a session between the print service 11 and the WWW server 30 and generates a session ID. The session ID is then stored in the session management area 13 (S209).

In step S210, the session management module 123 transmits a SOAP message (SOAP response) containing the session ID as a return value or an output parameter, to the WWW server 30 via the SOAP engine 122. The sever-side object 32 of the WWW server 30 manages the session ID returned as the return value or the output parameter for the session opening method in the WWW server 30.

Then, in step S211, since the session is appropriately opened, the server-side object 32 requests the print service 11 to provide a printer list, by transmitting a SOAP message (SOAP request) demanding call-up of the printer list acquiring method of the print module 113 of the print service 11, via the SOAP proxy 35. The SOAP proxy 35 adds the session ID to the SOAP header of the SOAP request, as in step S116 of FIG. 5, in order to report the session ID generated in step S209 to the print service 11 within the range of the standardized interface.

Then, in step S212, the message processing unit 1121 of the SOAP engine 112 in the print service 11 references the configuration table 1123 to call for the head analyzer 1122, and the session management unit 1122a of the header analyzer 1122 extracts the session ID from the SOPA header of the SOAP request to verify the validity of the session ID. That is, the session management unit 1122a determines whether the extracted session ID is the same as that stored in step S209 in the session management area 13. If the validity of the extracted session ID is verified, the process proceeds to step S213, and the message processing unit 1121 calls for the printer list acquiring method. The printer list acquiring unit 1131 of the print module 113 acquires a printer list.

The acquired printer list is transmitted to the WWW server 30 (S214), and a printer list page is transmitted to the Web browser 41 (S215).

Upon receiving a logout instruction from the user, the Web browser 41 transmits an HTTP request demanding logout to the WWW server 30 in step S216. Then, in step S217, the WWW server 30 requests the session management server 12 to close the session, by causing the sever-side object 32 to transmit a SOAP message (SOAP request), via the SOAP proxy 35, requesting call-up of the session closing method of the session management module 123. In step S218, the session management module 123 of the session management service 12 executes necessary processes for closing the session, including discarding the session ID stored in the session management area 13 and releasing the memory area used to manage the session. Then, in step S219, the session management module 123 transmits a SOAP message to the WWW server 30 via the SOAP engine 122, reporting the termination of the session. Then, in step S220, the server-side object 32 transmits a login page to the Web browser 41 via the httpd 31 so as to allow the user to log in again.

In the printing system 1 of the second embodiment, the session management service 12 with a session closing method can recognize the termination of the session upon receiving a call-up request for the session closing method, and discards information, such as the session ID, used for the session. Upon a logout instruction from the user, the printing system 1 can promptly close the session, which arrangement can prevent the session from being treated as valid even after the logout instruction.

The printing system of the second embodiment has been described above using the example in which the client (WWW server 30) is aware of the authentication using a ticket and the session management. The WWW server 30 recognizes the assigning of the ticket or the session ID to the SOAP header when transmitting a SOAP request, and the fact that the session ID is contained in the SOAP header of the SOAP response transmitted from the print service 11. Consequently, the session is maintained appropriately and the verification using the ticket works correctly.

This does not mean that the print service 11 can provide the service only to the client that adds the ticket or the session ID to the SOAP header. If the SOAP header of the SOAP request transmitted from the client does not contain the ticket or the session ID, the print service 11 simply determines that the client is not aware of the authentication function using a ticket or the session managing function. In this case, the print service 11 simply provides the requested service (such as providing a printer list) omitting the functions unique to the vender. In this manner, the print service 11 can continue to provide its services to those clients that are not aware of the independently developed functions, and the compatibility is sufficiently guaranteed.

In recent years and continuing, some apparatuses with embedded devices performing specific functions are designed so as to execute as much information processing as computers. Such an apparatus can function as, for example, a Web server on the network. An image forming and reproducing apparatus called a multi-function machine or an integrated machine is one of such apparatuses. The multi-function machine has installed multiple types of applications for performing image processing processes required for a printer, a copier, and a facsimile machine, independently.

Figure 13:
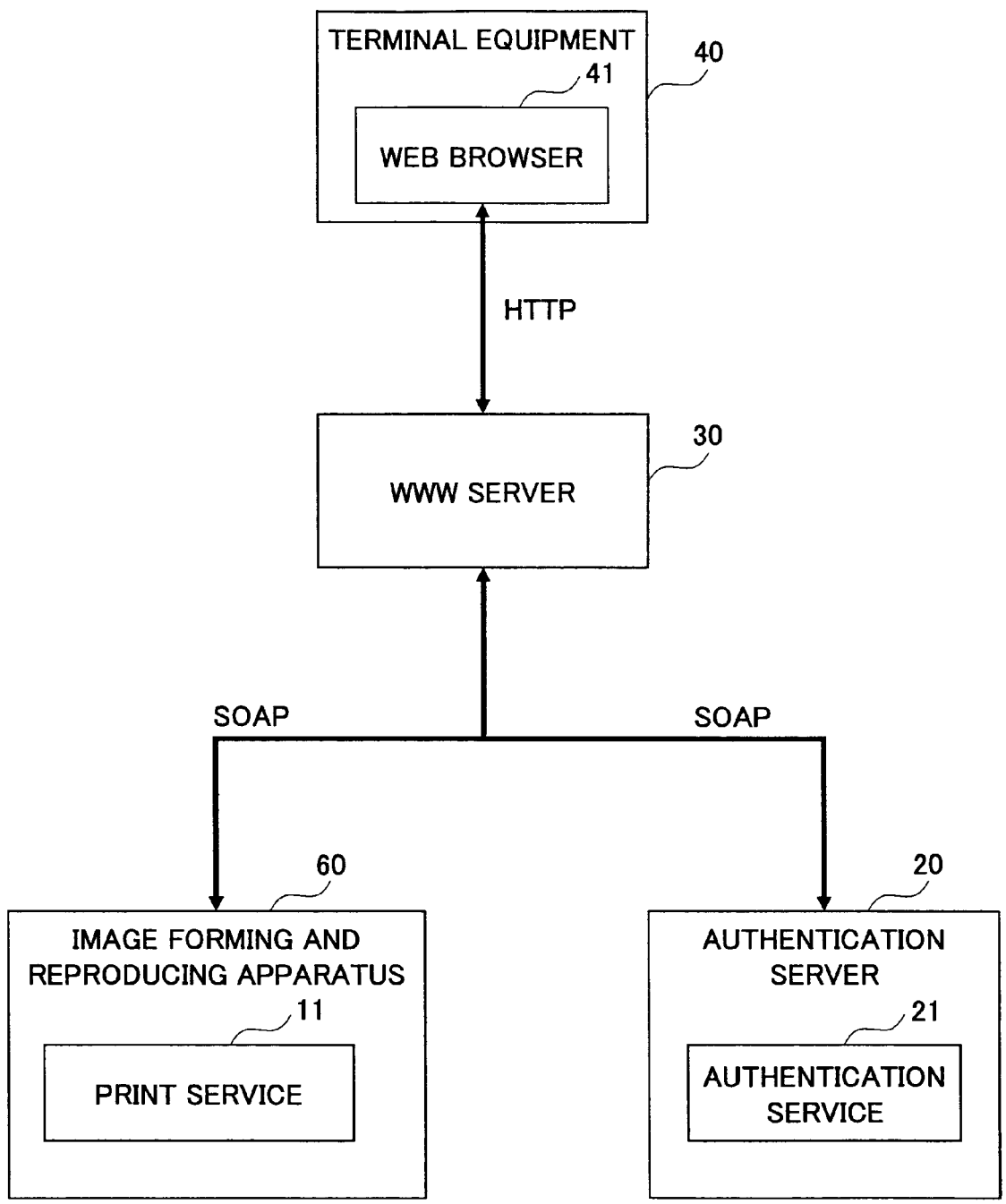
FIG. 13 is a block diagram of a printing system using an image forming and reproducing apparatus as a print server.
Figure 14:
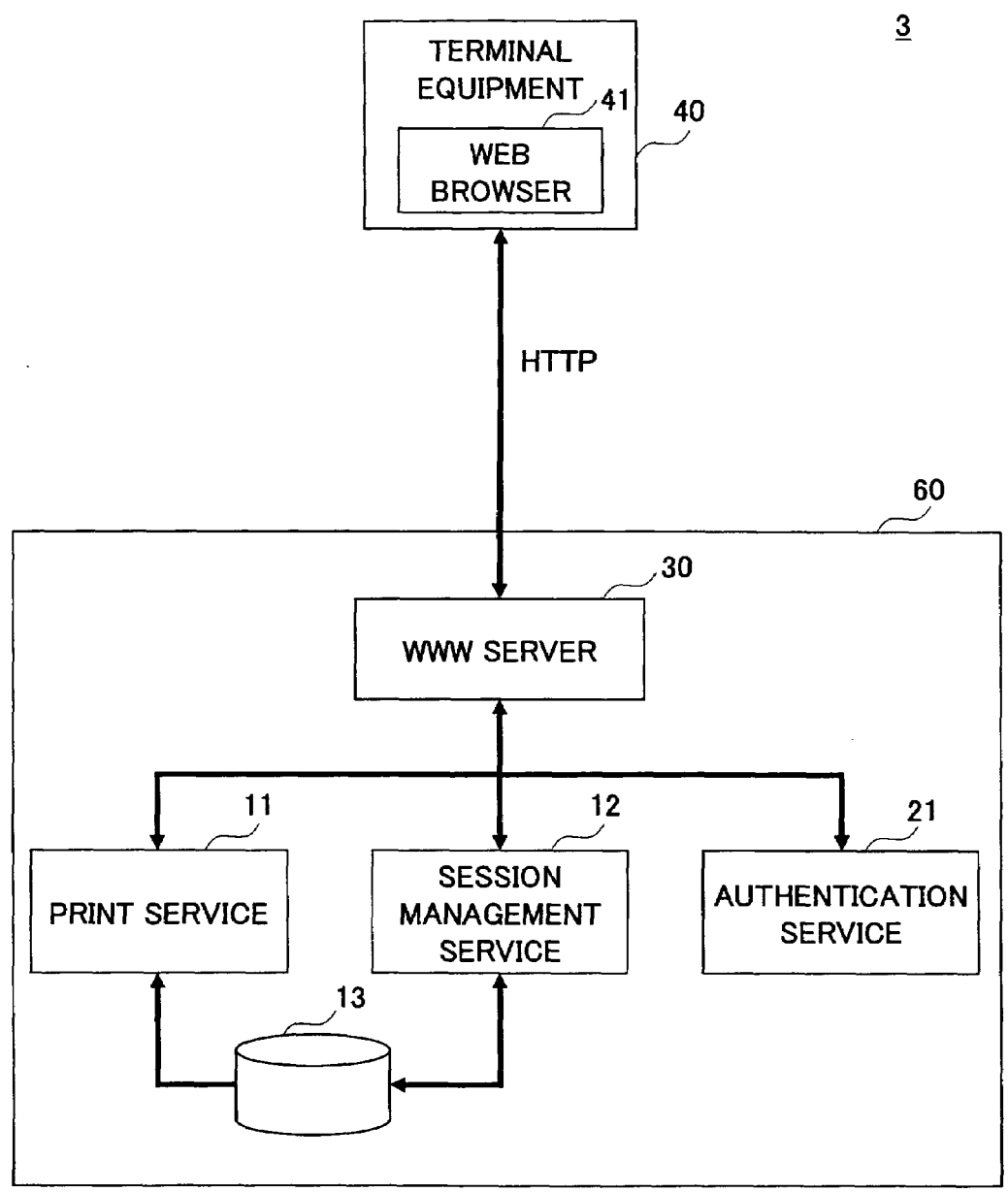
FIG. 14 is a block diagram of a printing system in which all the functions are implemented by an image forming and reproducing apparatus.

The printing system 1 of the present invention may be formed using such an image forming and reproducing apparatus, achieving the same effects and advantages. FIG. 13 is a schematic diagram of the printing system 2 in which the image forming and reproducing apparatus (multi-function machine) 60 functions as a print server. In FIG. 13, the same elements as those shown in FIG. 1 are denoted by the same numerical symbols, and an image forming and reproducing apparatus 60 is used in place of the print server 10. The image forming and reproducing apparatus 60 has installed the print service 11 configured to provide services based on the standardized interface, as in the print server 10. Consequently, the image forming and reproducing apparatus 60 can also realize the independently developed function unique to the vender, while maintaining the standardized interface. In addition, all of the functions of the print server 10, the authentication server 20, and the WWW server 30 of the first and second embodiments may be installed in the image forming and reproducing apparatus 60. FIG. 14 is a block diagram illustrating a printing system 3 in which the image forming and reproducing apparatus 60 performs the above-described functions. The same elements as those shown in FIG. 10 and FIG. 13 are denoted by the same numerical symbols and explanation for them is omitted. In the printing system 3, the image forming and reproducing apparatus 60 is implemented with a WWW server 30, a print service 11, a session management service 12, a session management area 13, and an authentication service 21. The WWW server 30 is not necessarily hardware itself, but may be a program realizing the function of the WWW Web server 30. The protocol between the WWW server 30 and the group of services (print service 11, the session management service 12, and the authentication service 21 in this example) may be the SOAP or another suitable local function call-up protocol. With this configuration, the image forming and reproducing apparatus 60 can realize all the functions of the print server 10, the authentication server 20, and the WWW server 30.

Although the invention has been described based on the preferred embodiments, the invention is not limited to these examples, and many modifications and substitutions can be made by those skilled in the art without departing from the scope of the invention, which is defined by the appended claims.

This patent application is based on and claims the benefit of the earlier filing date of Japanese Patent Application No. 2004-052270 filed Feb. 26, 2004, and NO. 2004-347042 filed Nov. 30, 2004, the entire contents of which are hereby incorporated by reference.

The invention claimed is:

1. A communications apparatus configured to provide a prescribed service via a network based on a standardized interface of a prescribed communications protocol, comprising:
　a processor configured to, upon receiving a request message representing a request for call-up of the standardized interface from a user, extract proof information about the user from a header region of the request message and have validity of the user verified based on the proof information, the proof information including information regarding valid services to be admitted with the proof information generated in accordance with a non-standardized interface;
　a processor configured to, upon receiving a request message representing a request for call-up of the standardized interface, extract a session ID for identifying a session to be held with a source apparatus of the request message from a header region of the request message and verify the validity of the session based on the session identification information, the session identification information generated in accordance with the non-standardized interface; and
　a service executing module configured to execute a process in accordance with the standardized interface for which the call-up is requested if the validity of the user and the session are verified.

2. The communications apparatus of claim 1, wherein the processor configured to extract proof information transmits the extracted proof information to an authentication apparatus connected to the communications apparatus via the network to cause the authentication apparatus to verify the validity of the user based on the proof information.

3. The communications apparatus of claim 2, wherein the processor configured to extract proof information extracts identification information about the authentication apparatus from the header region of the request message to specify the authentication apparatus for verification of validity of the user.

4. The communications apparatus of claim 2, wherein the proof information is a data item representing the fact that user authentication has been made by the authentication apparatus.

5. The communication apparatus of claim 1, wherein the processor configured to extract proof information assigns session identification information to a session with a source apparatus of the request message if the validity of the user is verified, and transmits a response message with the session identification information contained in the header region to the source apparatus based on the prescribed communications protocol.

6. The communications apparatus of claim 5, wherein the response message contains an information item output as a result of the execution by the service executing module.

7. The communications apparatus of claim 1, wherein the prescribed protocol is single object access protocol.

8. The communication apparatus of claim 1, wherein the processor configured to extract proof information includes:
　a message processing unit configured to cause the service executing module to execute the process in accordance with the standardized interface based on the request message requesting the call-up of the standardized interface;
　a header processing unit configured to extract the proof information from the head region of the request message and have validity of the user verified based on the proof information; and
　a call-up information storage configured to save call-up information about a calling method for the header processing unit;
　wherein the message processing unit calls for the header processing unit, based on the call-up information saved in the call-up information storage, in response to the request message.

9. The communications apparatus of claim 1, further comprising:
　a session management module configured to accept a session closing request based on the non-standardized interface.

10. The communications apparatus of claim 9, wherein the session management module further accepts a session opening request based on the non-standardized interface.

11. The communications apparatus of claim 10, wherein the session management module holds the session identification information assigned to the session in response to the session opening request in a prescribed memory area, and the processor configured to extract a session ID determines that the session is valid when the session identification information extracted from the header region of the request message is held in the prescribed memory area.

12. The communications apparatus of claim 11, wherein the session management module invalidates the session identification information held in the prescribed memory area in response to the session closing request.

13. The communications apparatus of claim 1, wherein the prescribed communication protocol is single object access protocol.

14. The communications apparatus of claim 1, wherein the processor configured to extract a session ID includes:
   a message processing unit configured to cause the service executing module to execute the process in accordance with the standardized interface based on the request message demanding the call-up of the standardized interface;
   a header processing unit configured to extract the session identification information from the header region of the request message and verify the validity of the session based on the session identification information; and
   a call-up information storing unit configured to save the call-up information as to a calling method for the header processing unit;
   wherein the message processing unit calls for the header processing unit in response to the request message, based on the call-up information saved in the call-up information storing unit.

15. A service providing method performed by a communication apparatus for providing a prescribed service from the communication apparatus via a network based on a standardized interface of a prescribed protocol, comprising the steps of:
   in response to a request message representing a request for call-up of the standardized interface, a processor of the communication apparatus extracts proof information about a user who made the request from a header region of the request message, the proof information including information regarding valid services to be admitted with the proof information generated in accordance with a non-standardized interface;
   verifying, by the processor, the validity of the user based on the proof information;
   in response to a request message representing a request for call-up of the standardized interface, the processor extracting session identification information for identifying a session with a source apparatus of the request message from a header region of the request message;
   verifying validity of the session based on the session identification information, the session identification information generated in accordance with a non-standardized interface; and
   executing, by the processor, a process in accordance with the standardized interface for which the call-up is made by the request message if the validity of the user and the session are verified.

16. The service providing method of claim 15, wherein the verification step includes transmitting the extracted proof information to an authentication apparatus connected to the communications apparatus via the network and causing the authentication apparatus to verify the validity of the user.

17. The service providing method of claim 16, wherein the extracting step includes extracting identification information about the authentication apparatus from the header region of the request message, and the verification step includes identifying the authentication apparatus for the verification of the user validity based on the identification information.

18. The service providing method of claim 15, further comprising the steps of:
   assigning session identification information to a session to be held with a source apparatus of the request message if the user validity is verified; and
   transmitting a response message containing the session identification information in the header region to the source apparatus based on the prescribed communications protocol.

19. The service providing method of claim 15, further comprising the step of:
   accepting a session closing request based on the non-standardized interface.

20. The service providing method of claim 19, further comprising the step of:
   accepting a session opening request based on the non-standardized interface.

21. The service providing method of claim 20, further comprising the steps of:
   assigning the session identification information to the session in response to the session opening request; and
   holding the session identification information assigned to the session in a prescribed memory area, wherein the session verification step includes determining that the session is valid if the session identification information extracted from the header region of the request message is held in the prescribed memory area.

22. The service providing method of claim 21, further comprising the step of:
   invalidating the session identification information held in the prescribed memory area in response to the session closing request.

23. A machine-readable recording medium storing a service providing program, which when executed by a communications apparatus for providing a prescribed service via a network based on a standardized interface of a prescribed protocol, causes the communications apparatus to perform a method comprising:
   receiving a request message representing a request for call-up of the standardized interface, and extracting proof information corresponding to a user who made the request from a header region of the request message, the proof information including information regarding valid services to be admitted with the proof information generated in accordance with a non-standardized interface;
   verifying validity of the user based on the extracted proof information;
   receiving a request message representing a request for call-up of the standardized interface, and extracting session identification information for identifying a session with a source apparatus of request message from a header region of the request message;
   verifying validity of the session based on the session identification information, the session identification information generated in accordance with a non-standardized interface; and
   executing the prescribed service in accordance with the standardized interface for which the call-up is made by the request message if the user validity and session validity are verified.

* * * * *